United States Patent
Leek

(10) Patent No.: US 11,160,255 B2
(45) Date of Patent: Nov. 2, 2021

(54) PET HARNESS AND/OR COLLAR WITH DEPLOYABLE CAPE

(71) Applicant: Leonard Leek, Lansing, MI (US)

(72) Inventor: Leonard Leek, Lansing, MI (US)

(*) Notice: Subject to any disclaimer, the term of this patent is extended or adjusted under 35 U.S.C. 154(b) by 379 days.

(21) Appl. No.: 16/233,541

(22) Filed: Dec. 27, 2018

(65) Prior Publication Data

US 2020/0205379 A1 Jul. 2, 2020

(51) Int. Cl.
*A01K 27/00* (2006.01)
*A01K 13/00* (2006.01)

(52) U.S. Cl.
CPC .......... *A01K 27/002* (2013.01); *A01K 13/006* (2013.01); *A01K 27/008* (2013.01)

(58) Field of Classification Search
CPC .... A01K 27/002; A01K 27/001; A01K 27/00; A01K 27/008; A01K 13/006; A01K 13/008; A41D 27/18; A41D 3/08; A41D 3/02; A41D 3/04; A41D 15/04; A45F 4/12

See application file for complete search history.

(56) References Cited

U.S. PATENT DOCUMENTS

| | | | | |
|---|---|---|---|---|
| 5,537,954 | A * | 7/1996 | Beeghly | A01K 13/006 119/850 |
| 5,644,902 | A * | 7/1997 | Kemp | A01K 27/008 54/37.1 |
| 5,970,921 | A * | 10/1999 | Fulton | A01K 13/006 119/858 |
| 6,637,367 | B1 * | 10/2003 | Dost | A01K 1/0353 119/28.5 |
| 6,679,198 | B1 * | 1/2004 | LaGarde | A01K 15/02 119/792 |
| 2004/0194436 | A1 * | 10/2004 | Frink | A01K 23/00 54/79.1 |
| 2008/0047995 | A1 * | 2/2008 | Psilogenis | A45C 9/00 224/577 |
| 2008/0115738 | A1 * | 5/2008 | Cherrett | A01K 13/008 119/850 |
| 2015/0026863 | A1 * | 1/2015 | Elsmo | A47G 9/066 2/84 |
| 2017/0013804 | A1 * | 1/2017 | Fachner, Sr. | A01K 27/001 |
| 2017/0258209 | A1 * | 9/2017 | Leek | A41D 27/18 |
| 2018/0160651 | A1 * | 6/2018 | Holt | A01K 27/008 |
| 2019/0297845 | A1 * | 10/2019 | Gilbert | A01K 13/006 |

FOREIGN PATENT DOCUMENTS

| | | | | |
|---|---|---|---|---|
| CN | 110122347 A | * | 8/2019 | ........... A01K 1/0254 |
| DE | 202018001238 U1 | * | 6/2018 | ........... A01K 13/006 |
| DE | 102018101045 A1 | * | 7/2019 | ........... A01K 27/008 |
| GB | 2039704 A | * | 8/1980 | ........... A01K 13/006 |
| GB | 2350544 A | * | 12/2000 | ........... A01K 13/006 |
| GB | 2513293 A | * | 10/2014 | ........... A01K 13/006 |
| WO | WO-9314627 A1 | * | 8/1993 | ........... A01K 13/002 |
| WO | WO-2012095533 A1 | * | 7/2012 | ........... A01K 13/008 |

* cited by examiner

*Primary Examiner* — Kathleen I Alker
(74) *Attorney, Agent, or Firm* — Gunther J Evanina; Butzel Long

(57) ABSTRACT

A combination pet harness and pet raincoat includes a pouch configured to extend longitudinally along a back of a mammalian quadruped, chest and waist strap assemblies for securing the pouch on the back of the pet and a cape that is selectively storable in the pouch and deployable from the pouch.

14 Claims, 12 Drawing Sheets

PET HARNESS AND/OR COLLAR WITH DEPLOYABLE CAPE

CROSS-REFERENCE TO RELATED APPLICATIONS

Not Applicable.

FIELD OF THE DISCLOSURE

This disclosure relates to harnesses and/or collars with rain gear for pets, especially mammalian quadrupeds, such as dogs and cats.

BACKGROUND OF THE DISCLOSURE

Various harnesses and rain gear for dogs and cats are described in the open literature and are commercially available. Pet harness are marketed to provide a means for reducing the risk of neck and trachea injuries, enhance control over the pet, and to reduce the risk of escape when the pet is leashed. Conventional pet rain gear are designed for protecting the pet from precipitation and must generally be used in combination with a collar if the pet is to be leashed while being protected from the rain.

SUMMARY OF THE DISCLOSURE

Disclosed are a pet harness and pet collar having rain gear that can either be concealed or deployed.

The disclosed pet harness employs an elongate pouch configured to extend longitudinally along the back of a pet (typically a mammalian quadruped such as a dog or cat). The harness includes suitable strap assemblies to facilitate mounting of the harness on the pet. Contained within the pouch is a deployable cape that can be draped over or wrapped around the side of the pet to provide protection against rain or other precipitation.

DETAILED DESCRIPTION OF THE EMBODIMENTS

Figure 1:
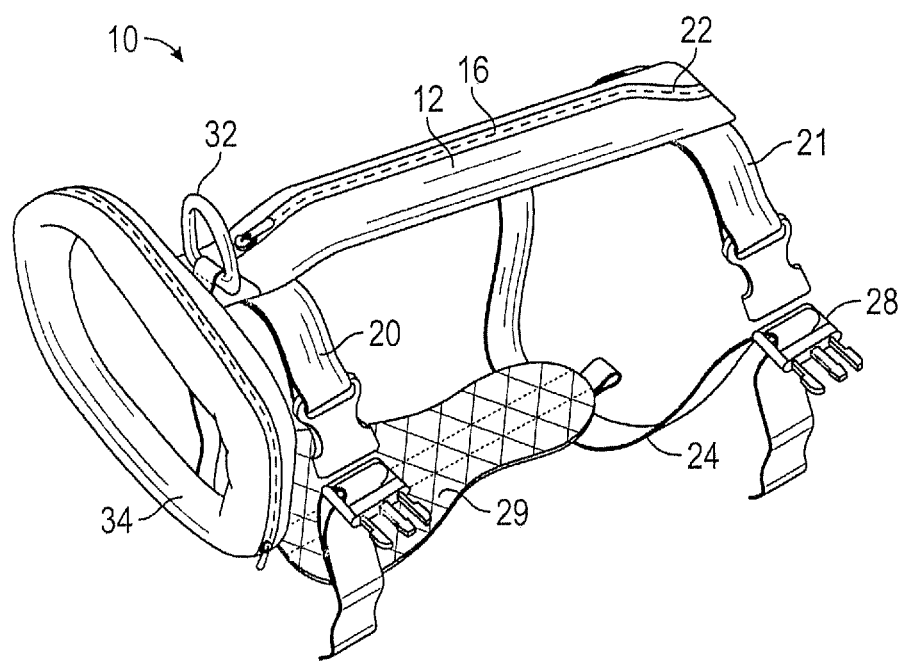
FIG. 1 is a perspective view of a harness in accordance with this disclosure.
Figure 2:
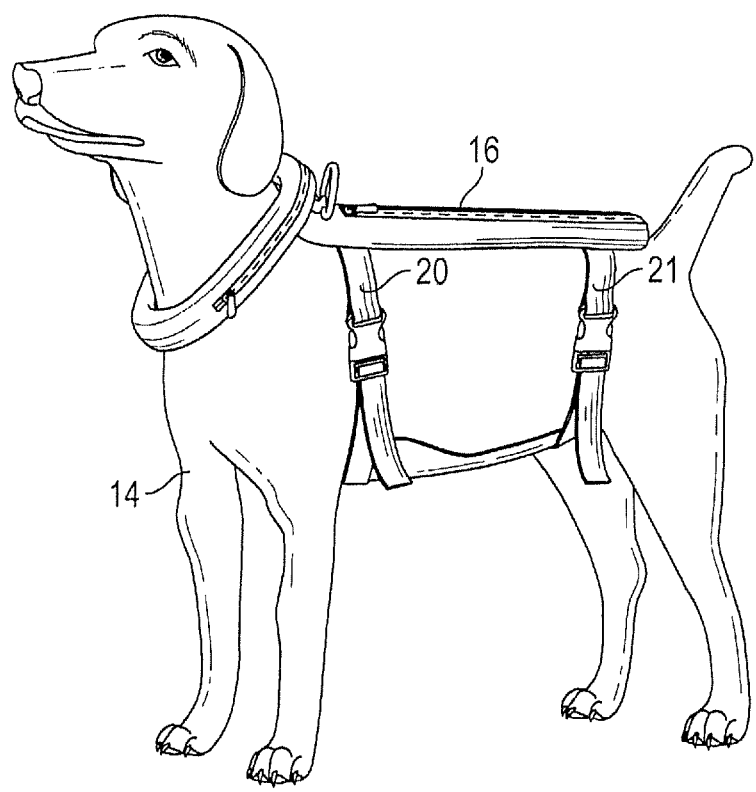
FIG. 2 is a perspective view of the harness of FIG. 1 mounted on a dog without the cape deployed (i.e., with the cape stowed in the pouch).
Figure 3:
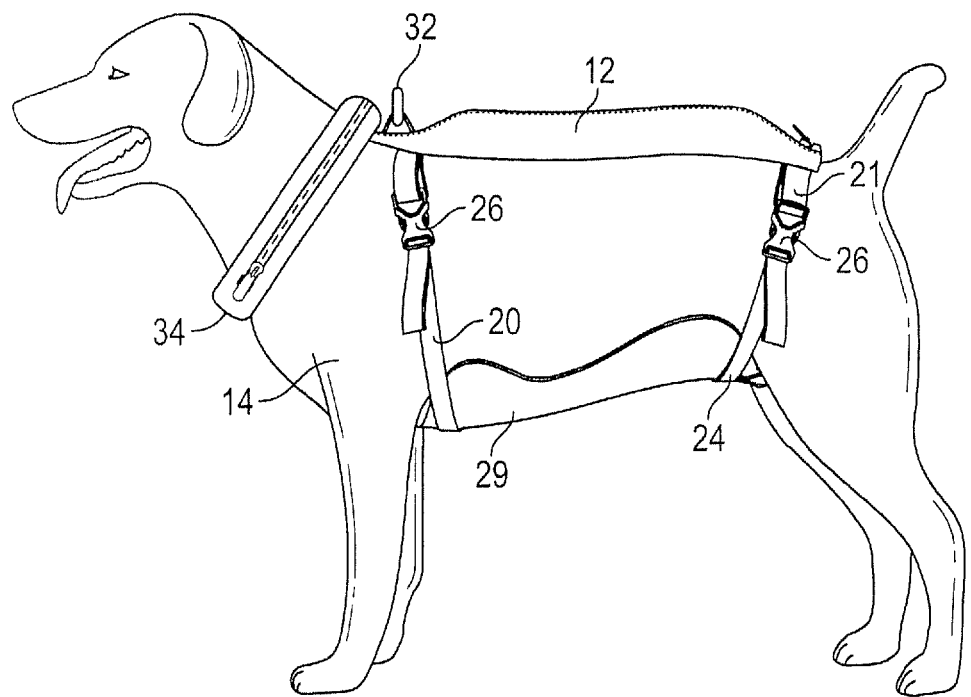
FIG. 3 is a side view of the harness of FIG. 1 mounted on a dog without the cape deployed (i.e., with the cape stowed in the pouch).
Figure 4:
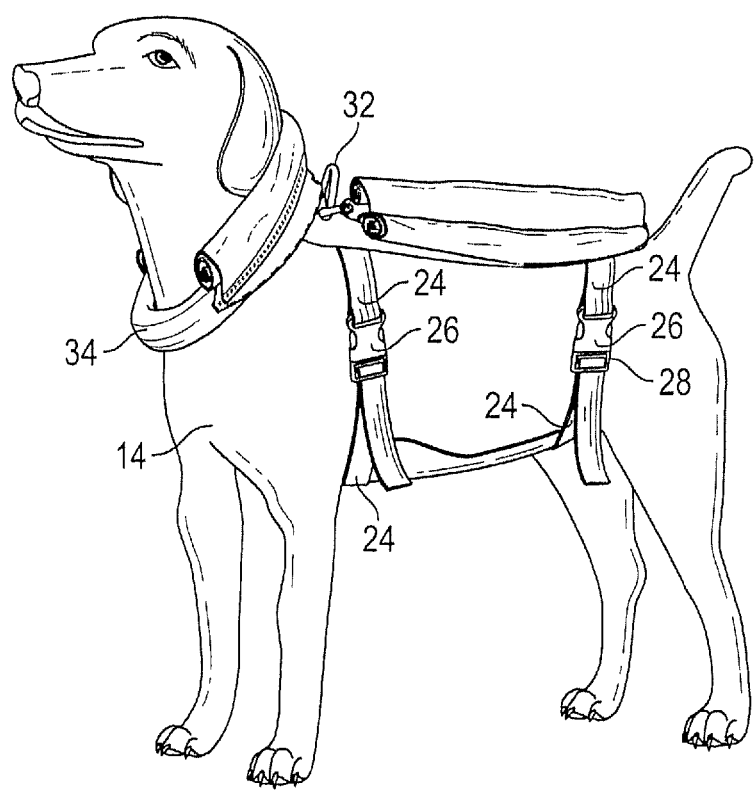
FIG. 4 is a side view of the harness of FIG. 1 mounted on a dog without the cape deployed (i.e., with the cape stowed in the pouch) with the pouch open and the cape partially deployed.

The pet harness 10 with deployable cape or coat generally includes an elongate pouch 12 that is configured to extend longitudinally along a back of a mammalian quadruped 14 (FIGS. 1 and 2). The pouch includes an opening 16 that generally extends along the length of the pouch and is closable to stow a cape 18 (FIGS. 4-7) within the pouch, and operable to allow deployment of the cape, which can generally cover the torso of the quadruped. Strap assemblies 20, 21 are provided to secure the pouch and harness to the quadruped. The elongate pouch 12 can comprise a plurality of fabric panels that are stitched, sewn, and/or riveted or otherwise suitably joined together to define a closable pocket-like structure in which a cape can be stowed. The elongate pouch 12 is suitably configured to extend along a back (dorsal) side of a mammalian quadruped 14, such as a pet, and, in particular, a dog or a cat, without covering a substantial portion of the mammalian quadruped. In particular, the elongate pouch has a length that is about equal to the length between the top of the shoulders of the quadruped to the last (posterial) rib of the quadruped. This distance can vary depending on the size of the quadruped. For example, for small dogs (e.g., Westminster Terriers) the length is about 6-7.5 inches, and can range up to about 11.5-13 inches for very large dogs (e.g., Great Danes). The pet harness with concealed cape can be manufactured in different sizes to accommodate a wide variety of dog breeds of different size, as well as other quadrupeds (e.g., cats). The width of the pouch is generally as narrow as reasonably possible while allowing the cape to be easily deployed from and stowed within the pouch (e.g., a width of about one-half to one inch).

The opening 16 in the pouch preferably extends generally along substantially the entire length of the pouch to facilitate deployment and storage of the cape 18. The closure 22 for the opening is preferably a zipper. However, hook and loop (e.g., Velcro type) fasteners, buttons, snaps, etc., may also be suitably employed.

The chest strap assembly 20 can include any number of strap segments 24 and buckles 26, double D-ring strap connectors, or other strap fasteners for connecting the strap segments together and/or connecting the strap segment(s) or strap(s) to one or both opposite sides of the anterior end of the elongate pouch (i.e., the end nearest the head or front of the quadruped). For example, a single strap could be affixed (e.g., sewn or riveted) at its approximate center to the anterior end of the elongate pouch and have a clasp or buckle parts at the opposite ends of the strap that are configured to secure the loose ends of the strap together around the chest of the quadruped. As another example, a first and/or a first strap could be fixed to a first side of the anterior end of the elongate pouch and a first end of a second strap could be fixed to a second side of the anterior end of the elongate pouch (opposite the first side). Loose second ends of the two straps could be provided with clasps or buckle parts that can be connected together at the ventral (bottom) side of the quadruped. At least one of the clasps or buckle parts can, and preferably does, have an adjustable webbing slider 28 to allow the length of the chest strap assembly to be adjusted to facilitate a good fit of the strap assembly around the chest of the quadruped so that the harness is secured in a proper position without pinching or binding. Preferred buckles include plastic side release buckles.

The strap or strap segments can for example, comprise polypropylene webbing straps, nylon webbing straps, or polyester webbing straps. The width of the webbing can be selected as needed or desired based on the size of the quadruped, with suitable widths ranging from about half-inch to one and one-half inch (0.5-1.5 inches).

The waist strap assembly 21 can be substantially the same as the chest strap assembly. However, it is attached to a posterior end of the elongate pouch and is configured (e.g., has a length suited) to extend around the waist of the quadruped to allow the posterior end of the pouch to be secured at the waist of the quadruped.

Figure 5:
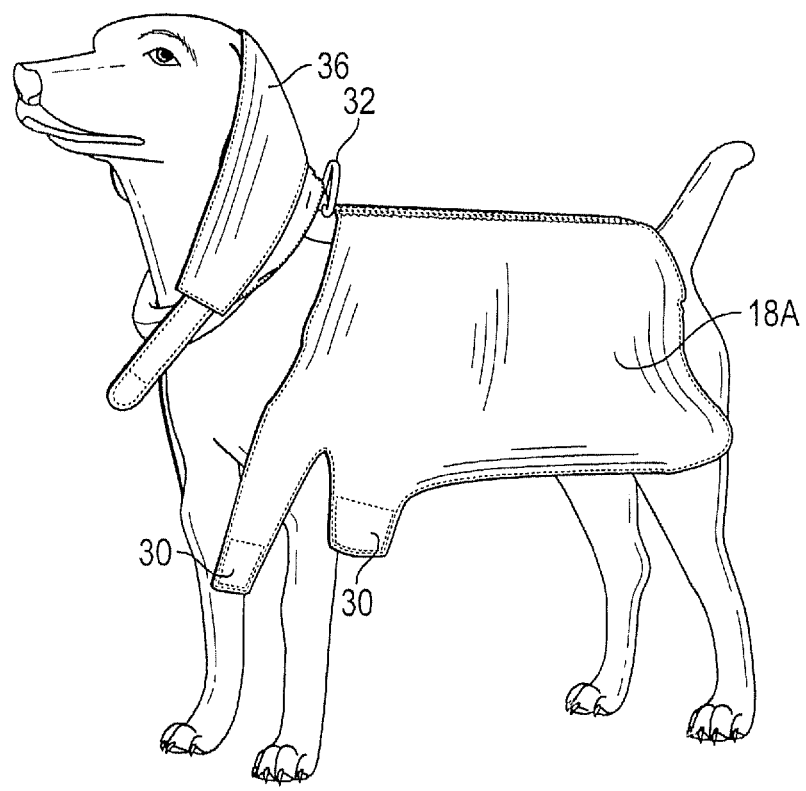
FIG. 5 is a perspective view of the harness of FIG. 1 mounted on a dog with the cape fully deployed from the pouch.
Figure 6:
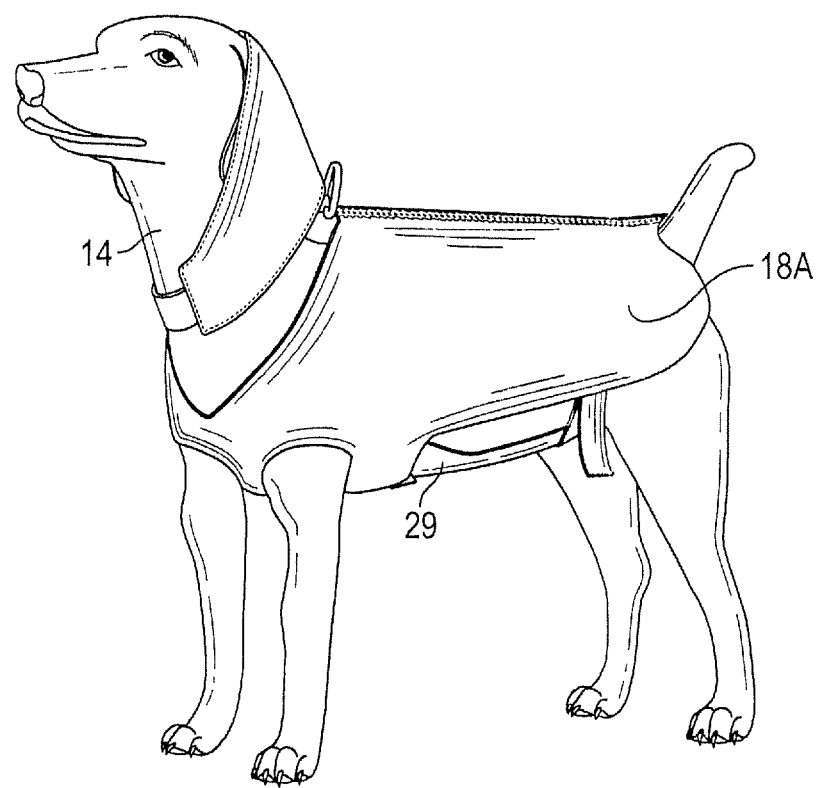
FIG. 6 is a perspective view of the harness of FIG. 1 mounted on a dog with the cape fully deployed from the pouch and with loose ends of the cape fastened together.
Figure 7:
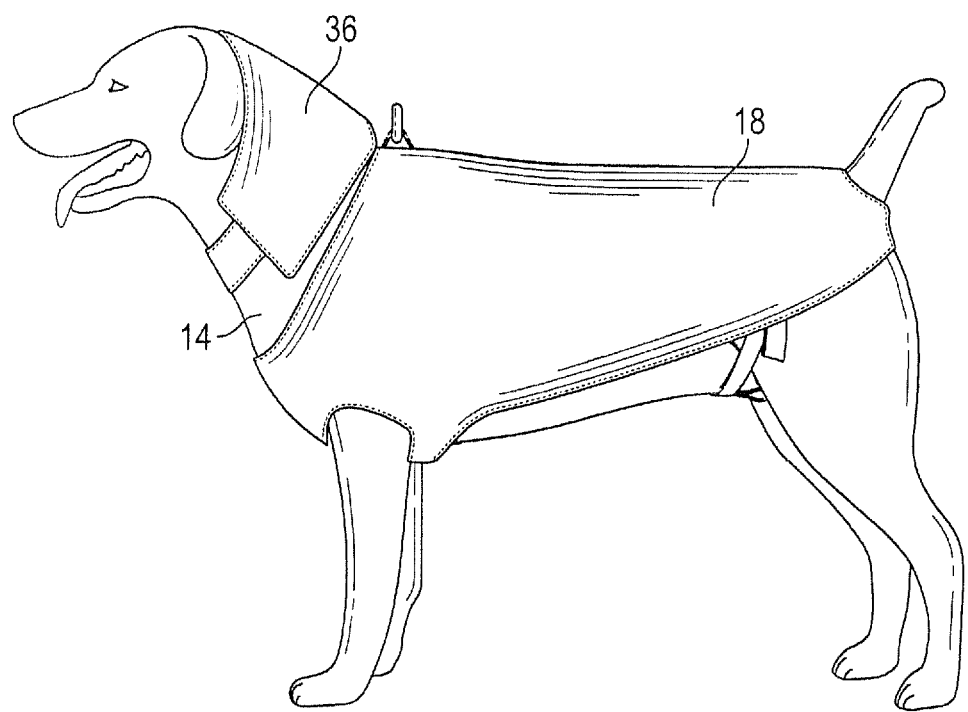
FIG. 7 is a side view of the harness of FIG. 1 mounted on a dog with the cape fully deployed from the pouch and with loose ends of the cape fastened together.

The cape (or covering) can comprise a single fabric panel that can be deployed from the pouch, with one end or section of the panel fixed to the interior of the pouch and a second or loose end of the fabric panel releasably secured to the pouch after the panel is wrapped around the torso of the quadruped. Alternatively, the cape or covering can comprise two panels deployable from opposite sides of the pouch (as shown in FIGS. 4-7), with each panel having a first end or section fixed to the interior of the pouch and a second or loose end that can be releasably secured to the other panel 18A or to a brisket plate 29 supported on and affixed at respective opposite (anterior and posterior) ends thereof to the chest strap assembly and waist strap assembly. FIG. 5 shows the left side panel hanging loosely from the pouch. A right side panel (not shown) can hang loosely from the pouch over the right side of the quadruped and be joined to the left side panel, such as with hook and loop (e.g., "Velcro" type) fasteners 30. The right panel is a mirror image of the illustrated left panel.

In those embodiments utilizing a brisket plate 29, the brisket plate can have a spatulate or spoon shape, having a broad end proximate the brisket or chest of the quadruped, and a tapered end proximate the abdomen of the quadruped. The waist and chest strap assemblies can include a section that is affixed to a respective end of the brisket plate. Alternatively, the brisket plate can be provided with loops through which the strap assemblies can be threaded to support the brisket plate. The brisket plate may, and preferably is padded to ensure greater comfort for the quadruped on which the harness is worn. Suitable padding materials include polyester wadding (e.g., 90-300 grams per square meter).

In certain embodiments (as illustrated), the harness includes a D-ring 32 affixed at the anterior end of the pouch for attachment of a leash or the like.

Also in certain embodiments, the harness includes a collar 34 affixed to the pouch. The collar defines a circumferential pouch that contains a deployable hood 36 having an end affixed to an interior of the circumferential pouch. A lower edge of the hood can have fasteners for releasably connecting the hood to a forward or posterior edge of the cape. The hood is preferably releasably connectable to the cape with hook and loop (Velcro-type) fasteners, although snaps, buttons or other type fasteners may be employed. The collar 34 can be designed to slide over the head of the quadruped (e.g., dog) or it can have one or more straps and/or fasteners that provide adjustability to facilitate a snug or loose fit, as desired.

The cape and hood are preferably made of a fabric panel or a plurality of fabric panels that are sewn, or otherwise joined, together. The hood and cape are preferably made of a water-repellant material that is light in weight and desirably breathable (i.e., allows air but not moisture to pass through). A suitable material is polyurethane coated polyester twill, preferably having a weight of about 90 grams per square meter or less (e.g., 60 grams per square meter or less). Especially preferred are ripstop fabrics that are woven to resist tearing and ripping, including polyurethane coated ripstop polyester twill. Another preferred fabric is polyurethane coated nylon fabrics having a weight of about 90 grams per square meter or less (e.g., 60 grams per square meter or less).

Figure 8:
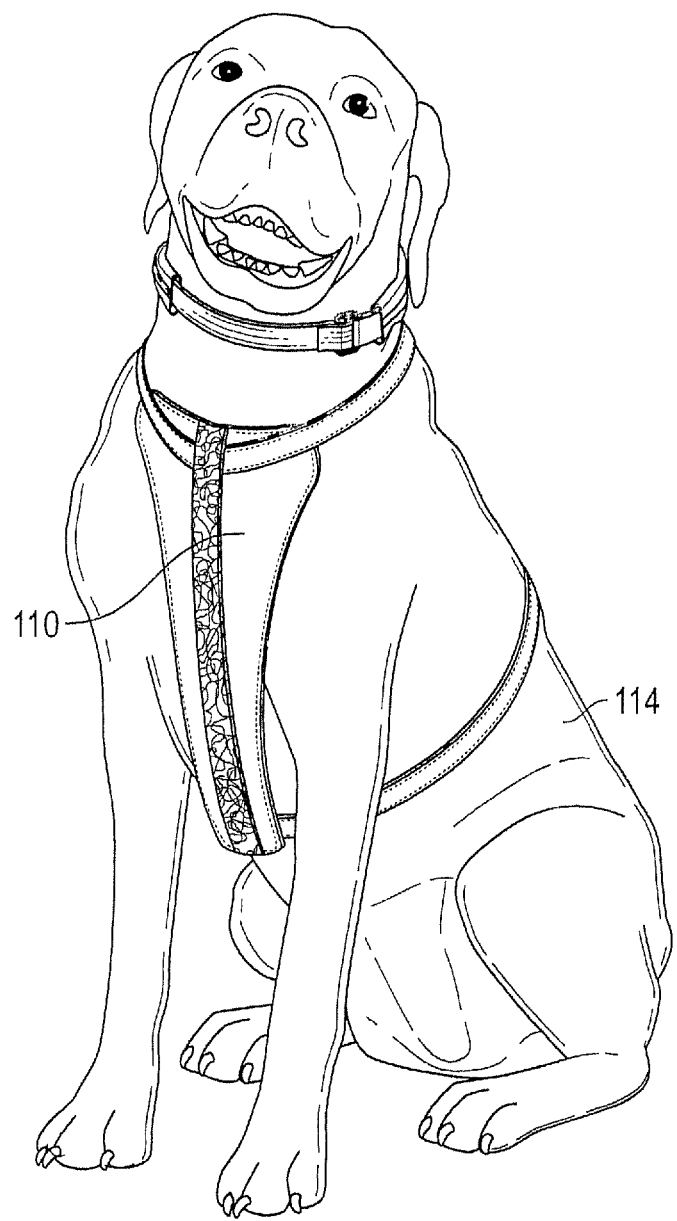
FIG. 8 is a perspective view of an alternative embodiment with the cape stowed in the harness pouches.
Figure 9:
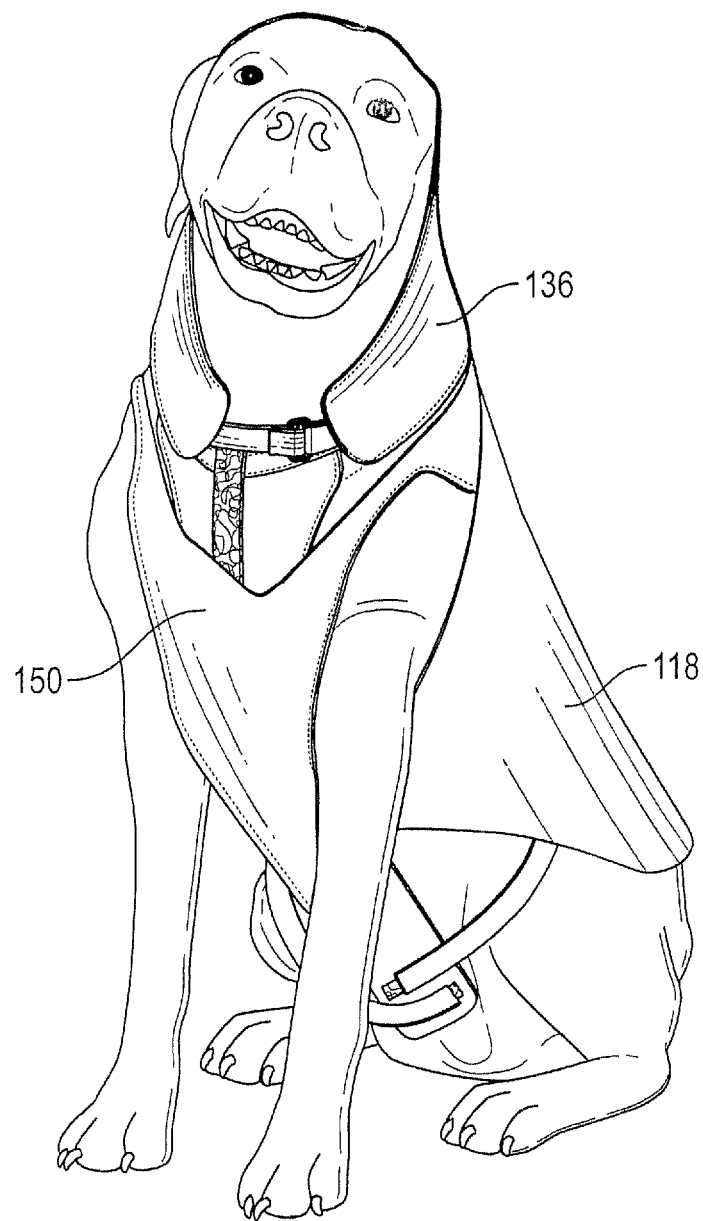
FIG. 9 is a perspective view of the harness shown in FIG. 8 with the cape fully deployed.

An alternative embodiment 110 of the pet harness with deployable cape is shown in FIGS. 8 and 9. It differs from harness 10 by including a bib portion 150 that extends from the deployable hood 136. When fully deployed, bib 150 extends rearwardly between the front legs of quadruped 114 along the belly of the quadruped and is provided with fastening means (e.g., hook and loop type fasteners) for joining it with the cape 118.

Figure 10:
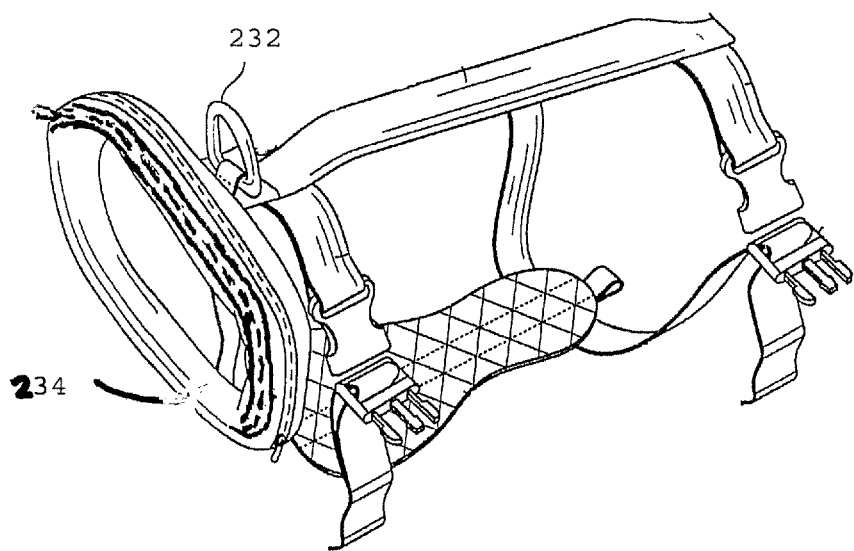
FIG. 10 is a perspective view of a pet collar defined by an elongate pouch containing a deployable cape or coat.
Figure 11:
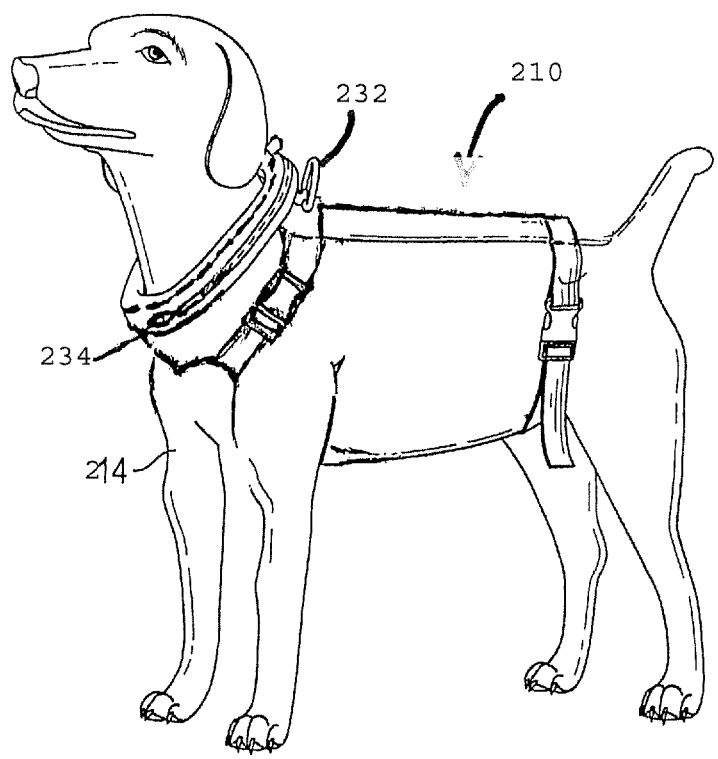
FIG. 11 is a perspective view of the collar of FIG. 10 around a neck of a dog.
Figure 12:
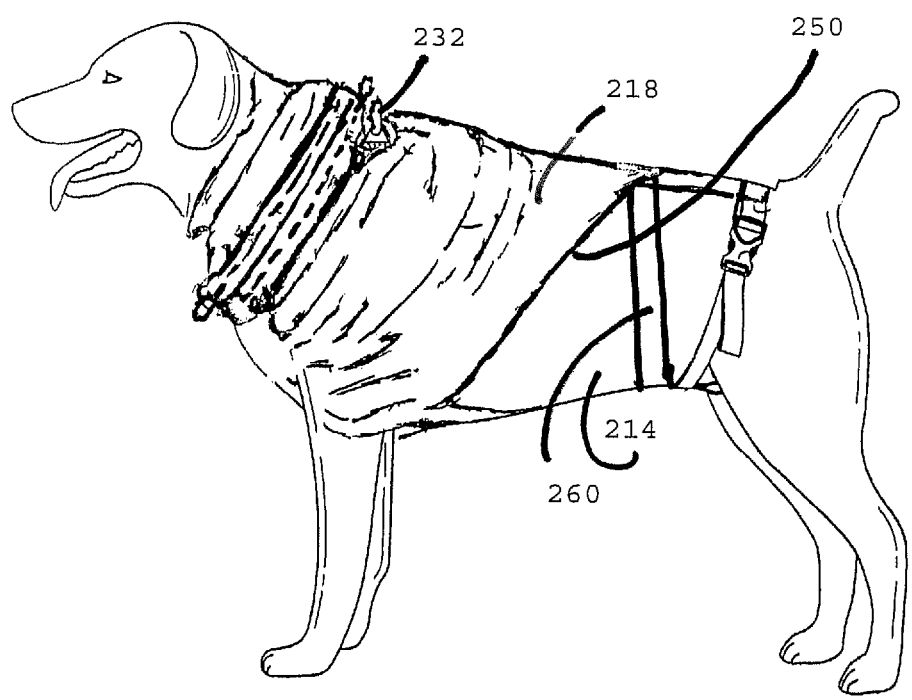
FIG. 12 is a side view of the collar of FIGS. 10 and 11 with the cape partially deployed and covering the back and side of the dog.

Shown in FIGS. 10-12 is a collar 234 formed from an elongate pouch having an opening with a closure (e.g., zipper), and which contains a cape 218 or coat that can be deployed (as shown in FIG. 12) to cover the back and/or sides of a quadruped (e.g., dog 214) to keep the quadruped protected from the elements (e.g., rain, snow, etc.). Collar 234 can be attached to a harness 210, either releasably (e.g., snaps, etc.) or fixedly (e.g., sewn, etc.). Harness 210 can be generally similar to, or different from harness 10, and, in particular, need not be configured to include a pouch or deployable cape as with harness 10. The collar 234 can be designed to slide over the head of the quadruped (e.g., dog) or it can have one or more straps and/or fasteners that provide adjustability to facilitate a snug or loose fit, as desired. Optionally, a D-ring 232 can be provided. D-ring 232 can be attached either to collar 234 or optional harness 210. The distal end 250 of cape 218 can be provided with straps 260 (similar to strap assembly 24) or other means for maintaining the cape in a deployed condition covering the back and sides of the quadruped 214.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A pet harness with concealed cape, comprising:
an elongate pouch configured to extend longitudinally along a back of a mammalian quadruped, the elongate pouch having an opening and a closure, the elongate pouch having a length of from about 6 to about 13 inches, and a width of from about one-half inch to one inch;
a chest strap assembly attached to an anterior end of the elongate pouch and configured to extend around a chest of the mammalian quadruped to secure the anterior end of the elongate pouch on the back of the mammalian quadruped;
a waist strap assembly attached to a posterior end of the elongate pouch and configured to extend around a waist of the mammalian quadruped to secure the posterior end of the elongate pouch on the back of the mammalian quadruped; and a cape deployable from the elongate pouch when the closure is open, the cape having at least a first panel having a first section fixed to an interior of the elongate pouch and a free section that can be draped or wrapped around a side of the mammalian quadruped.

2. The pet harness of claim 1, wherein the pouch closure is a zipper.

3. The pet harness of claim 1, wherein each of the strap assemblies includes at least one strap segment and at least one buckle.

4. The pet harness of claim 3, wherein the strap segments comprise polypropylene or nylon webbing.

5. The pet harness of claim 1, further comprising a second panel affixed to an interior of the elongate pouch and a free section that can be draped or wrapped around a side of the mammalian quadruped.

6. The pet harness of claim 1, further comprising a brisket plate supported on the strap assemblies.

7. The pet harness of claim 6, wherein the brisket plate is padded.

8. The pet harness of claim 6, wherein the padding is polyester wadding.

9. The pet harness of claim 1, wherein a D-ring is affixed at the anterior end of the elongate pouch.

10. The pet harness of claim 1, further comprising a collar affixed to the elongate pouch, the collar defining a circumferential pouch that contains a deployable hood.

11. The pet harness of claim 1, wherein the cape is made of a water-repellant fabric.

12. The pet harness of claim 11, wherein the fabric is a polyurethane coated polyester twill.

13. The pet harness of claim 12, wherein the fabric has a weight of about 90 grams per square meter or less.

14. The pet harness of claim 11, wherein the fabric is a polyurethane coated nylon.

* * * * *